United States Patent

[11] 3,539,211

[72] Inventors Oscar Dobarganes
505 E. 59th St., Hialeh, 33013;
Francisco Mendez, 3040 NW 21st Court,
Miami, Florida 33142
[21] Appl. No. 810,556
[22] Filed March 26, 1969
[45] Patented Nov. 10, 1970

[54] CONNECTOR JOINT FOR A HORIZONTAL FRAME AND VERTICAL FRAME SUPPORT
16 Claims, 7 Drawing Figs.
[52] U.S. Cl...................................................287/189.36,
108/107, 211/177
[51] Int. Cl...................................................... F16b
[50] Field of Search..........................................287/189.36,
189.36(H), 20.92(C), 20.92(D), 20.924, 20.925
20.296, 20.927, 189.36(G), 54(B), 54(C); 211/177,
182, 148, 106cur, 119cur; 52/283; 108/107

[56] References Cited
UNITED STATES PATENTS

| | | | |
|---|---|---|---|
| 1,895,766 | 12/1933 | Murphy........................ | 287/20.924 |
| 3,021,961 | 2/1962 | Ruhnke........................ | 211/177 |
| 3,376,980 | 4/1968 | Serra............................ | 211/148 |
| 3,451,183 | 6/1969 | Lespagnol et al............ | 287/189.36(H) |
| 3,463,524 | 8/1969 | Saxe............................. | 52/283X |

Primary Examiner—Reinaldo P. Machado
Assistant Examiner—Wayne L. Shedd
Attorney—John Cyril Malloy ABSTRACT: A connector joint for a horizontal frame having side rails and a corner support including a U-shaped saddle extending outwardly from the corner support beneath the frame and a wedge shaped key extending downwardly from the frame at the corner with said key and said saddle being sized to mate and interlock, said key and said saddle being secured to the medial vertical plane of the rail of the frame at the corner support and of the medial vertical plane of the corner support. Keeper means may be provided to releasably resist removal of the key when in the saddle.

Patented Nov. 10, 1970 3,539,211

INVENTOR.
OSCAR DOBARGANES
FRANCISCO MENDEZ
BY John Cyril Malloy
ATTORNEY.

CONNECTOR JOINT FOR A HORIZONTAL FRAME AND VERTICAL FRAME SUPPORT

It is an object of this invention to provide a connector joint for attaching a horizontal frame to corner supports. In the past there have been provided various types of connector joints for connecting frames to vertical supports. The present invention is of an improved corner joint and includes a saddle on the vertical support having an upwardly opening through socket to receive a wedge shaped key carried in depending relation on the end portion of the rails of the horizontal frame. The structure provides for a simple inexpensive connector joint which is adapted to be used to interconnect rails and vertical supports of varying thickness.

It is another object of this invention to provide a connector joint which includes a wedge type key to be received within a saddle and a coating of deformable material intermediate the confronting surfaces of the wedge-type key and the saddle for softening noises and which coating is adapted to be deformed into a seat to resist relative movement of the key in the saddle.

It is the general object of this invention to provide a releasable connector joint for interconnecting a horizontal frame and vertical corner supports which is simple in construction, inexpensive to manufacture and is adapted to be constructed from a variety of materials and which is characterized by close fitting interfaces of the rail and vertical support over a relatively large surface of abutment providing sturdy support for the frame.

In accordance with these and other objects which will become apparent hereinafter, the instant invention will now be described with reference to the accompanying drawings in which.

Figure 3:
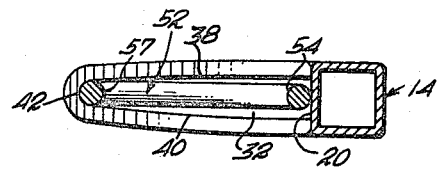
FIG. 3 is a view in cross section taken along the plane indicated by the line 3–3 of FIG. 2 and looking in the direction of the arrows.

Referring to the drawings there is shown a portion of a horizontal frame 12 and a vertical support 14. The frame includes a rail 16 having an end face 18 to be butted against a vertical face 20 of the corner support 14 for the frame. Beneath the end of the frame a retainer saddle 22 is provided. It is composed of a U-shaped member extending outwardly in perpendicular relation of the support face with the legs 24 and 26 of the U-shaped saddle being parallel, closely spaced and symmetrical with respect to the medial vertical plane of the face 20 in the preferred embodiment. The distal end of the legs are joined by the base portion 28 and means are provided, comprising the welding 30 shown in the drawings to connect the proximal end of the U-shaped member to the face 20 of the vertical support 14. As is seen in FIG. 3, the U-shaped member defines an upwardly facing through socket 32 and that the confronting faces of the legs within the socket are generally planar as indicated within the tolerances of manufacture. Each of the legs includes an upper edge 38 and 40 which merge and blend into the upper surface 42 of the base portion and the upper edges lie in a common plane beneath the rail. Also, the lower edges 44, 46 and 48 are substantially beneath the upper edges to provide a confronting inside surface to the saddle of substantial vertical dimension, which resists and restricts any tendency of the hangar to tilt when it is secured within the saddle. The area bounded by the upper edges and base portions of the U-shaped member and the face 20 of the vertical member it will be seen comprises a mouth about the socket as seen in plan in FIG. 3 with a major axis between the face of the saddle and the support face and a minor axis between the confronting surfaces of the legs. It is within this mouth and socket that the hangar now to be described is secured.

The hangar 52, which is generally wedge shaped is secured to the underface 53 of the ends portion 56 of the rail 16, that is, at the corner support. The hangar or hangar key 52, includes a first key surface 54 which extends in perpendicular relation downwardly from the end portion 56 at the corner and a second key surface 56 extending from the rail face 53 in a common plane with that of the surface 54 extending downwardly and converging toward said first surface so as to trace a generally triangular pattern in the preferred embodiment with the surfaces being joined at an apex 60. At the other ends the key is secured to the end portion of the rail, symmetrically with respect to the vertical medial plane longitudinally through said rail and with the first key surface 54 in close abutting relation to the vertical face 20 and symmetrically overlaying the medial vertical plane of the support face 20. The key is of a size such that the dimension between the surfaces 54 and 56 at their juncture with the face 53 of the rail 16, called the base line of the key, is greater than the dimension of the major axis of the saddle. The means to secure the key to the base line suitably comprises welding 62 and 64. As shown in the drawings, the horizontal spacing of the upward surface 42 of the base of the saddle from the surface 20 at the medial plane is less than the length of the base line and the distance between the surfaces 38 and 40 of the legs of the saddle are slightly greater than the thickness of the hangar key, i.e. the minor axis of the mouth. It is thus seen that by reason of this construction the key is adapted to be received in and snugly occupy the space within the saddle at the mouth with the upper surface 42 of the saddle interconnecting with the key surface 52 intermediate the length thereof while the surface 54 snugly overlays and is supported along the length thereof in abutting relation of the face 20 of the vertical support 14 comprising means to releasably secure the key in the saddle, because as vertical pressure indicated by the arrowed lines 66 is a part to the frame, the edge 42 will forceably bite into the surface 56 as indicated in FIG. 5.

In the preferred embodiment the surfaces 52 and 54 of the key comprise the outer surfaces of converging strut numbers 68 and 70 which are integral portions of a reversely bent length of bar stock with the acute angle of the apex being vertically spaced an equal distance from the rail. The strut members may be jacketed with a yieldable resilient cushiony material or rubbery material 72 to facilitate the wedge type securement of the surface 56 at the upper edge 42 of the base of the saddle, and to adapt the surface of the strut member for ready deformation into the seat-type configuration indicated in FIG. 5 and designated by the numeral 74. To facilitate this action, in the preferred embodiment the U-shaped saddle is inclined downwardly with respect to a horizontal attitude so that the face 76 of the base portion 28 which confronts the surface 56 diverges outwardly with respect to the surface of the key as illustrated in FIG. 5. Alternative, the strut may be composed of a cylindrical bed 78 preferably of circular cross section of relatively rigid yet slightly deformable plastic material indicated in FIG. 7, reinforced by vertical support rods which may be of metal or of relatively thick fibres or a series 80 of closely spaced adjacent strands, which may be multifilament of glass material or other suitable reinforcing elongate matter.

Figure 5:
FIG. 5 is an enlarged portion of the juncture of the retainer saddle and hanger and illustrating a modified embodiment of the invention.
Figures 6, 7:
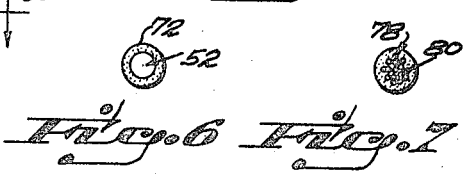
FIGS. 6 and 7 are end views of the hanger means.

The means to releasably secure the key in the saddle may also include a keeper 82, shown in FIG. 5 which includes an inner body of relatively rigid material 84 which is suitably jacketed with plastic material 86 and which is configured so as to be receivable within the space between the struts of the key. Also, a flange 88 and 90 may be provided to extend from the opposite surfaces of the keeper and overlay the surfaces which include the edges 34 and 36 and position a through hole 92 transversely through the body in alignment with a through hole 94 in the saddle legs for receiving a shaft of a screw indicated by the numeral 96.

Figure 1:
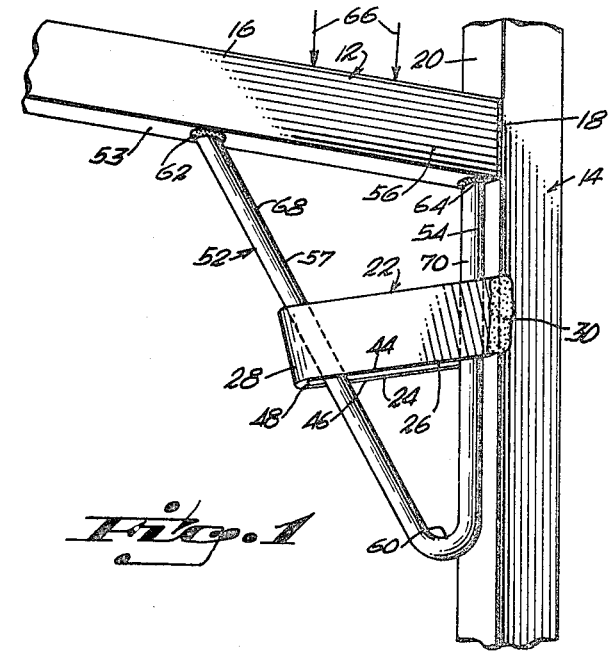
FIG. 1 is a perspective view of a corner joint for the rail of a horizontal frame and a vertical frame support.
Figure 2:
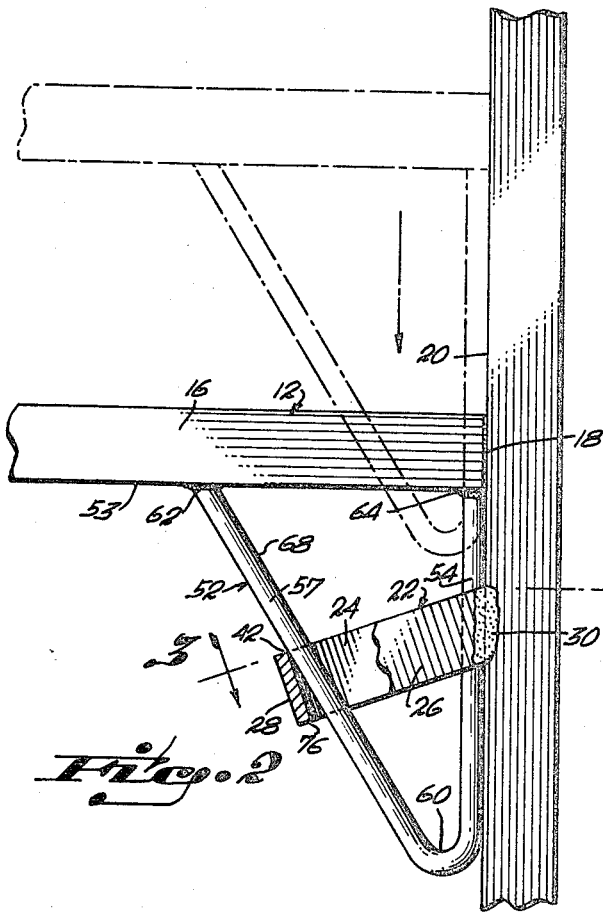
FIG. 2 is an elevation view which has been partly broken away and illustrates in chain-dot line the assembly of the horizontal frame and vertical frame support.
Figure 4:
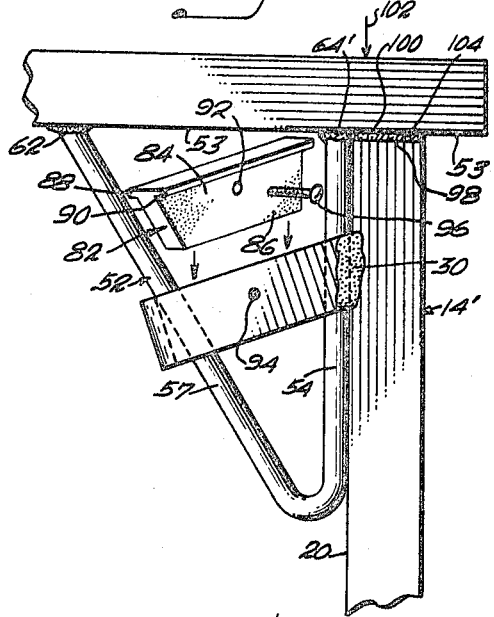
FIG. 4 is a view of the instant invention illustrating an alternative use of the invention.

As seen in FIG. 4, the lower face 54' of the rail overlays the upper end 98 of the vertical support 14' and that the surface 62' of the means to secure the key to the rail is coextensive with the surface 54' constituting a continuation thereof so that the gap 100 is adapted to be closed by vertical pressure indicated by the arrowed lines 102 to secure the frame and support at the corner when the screw 96 has been passed through the holes 92 and 94 while the plastic jacketing cushions the abutting surfaces of the hangar and key. To this end, a pad, 104 is provided in the preferred embodiment between the confronting faces of the rail and a vertical support in either the embodiment of FIG. 1 or FIG. 4. The thickness of the faces 20 and 54 are relatively immaterial because the key is arranged symmetrically with respect to these faces and in this manner the connected joint may be employed in a variety of environments wherein close arrangement of abutting parts is desirable with structure which provides for the rapid disassembly of these parts, such as in a hospital installation or other type institutional use.

We claim:

1. A connector joint for a horizontal frame to connect to a vertical frame support comprising:
   A. a corner support having a vertical face beneath the end of the frame;
   B. a retainer saddle beneath the frame comprising a U-shaped member extending outwardly in perpendicular relation of the support with the legs of said U-shaped member being parallel, closely spaced and symmetrical with respect to the medial vertical plane of said face, and terminating at a distal base portion;
   C. means connecting the proximal ends of the legs of said U-shaped member to the face of said vertical support:
      a. said U-shaped member defining an upwardly facing through socket;
      b. the confronting surfaces of said legs being generally planar and having a pair of upper edges in a common plane beneath said rail and a pair of lower edges spaced substantially beneath said upper edges; and
      c. the area bounded by said upper edges, the base portion of said U-shaped member and said face of said vertical member comprising the mouth of said socket as seen in plan, with a major axis between the base of said saddle and said support face and a minor axis between the confronting surfaces of said legs;
   D. a horizontal rail on the frame with one end at the corner;
   E. a wedge-type hanger key having a first key surface extending in perpendicular relation downwardly from the end portion of the rail at said corner, and a second key surface extending from said rail in a common plane downwardly and converging toward said first surface, said key surfaces being spaced from one another at the rail by a base line;
   F. means to secure the key at the base line to the end portion of the rail in overlaying relation of the vertical medial plane through said rail and with the first key surface in close abutting relation to the vertical face and overlaying the medial vertical plane of said support:
      a. said hanger key being sized such that the length of said base line between the first and second surfaces is greater than the length of said major axis;
      b. means connecting said first and second surfaces of said hanger key; and
      c. said first and second surfaces, said base line and said means interconnecting said first and second surfaces bounding said key and said key having a horizontal dimension between said first and second surfaces less than the major axis of said mouth, and said key having a transverse thickness slightly less than the minor axis of said mouth;
   G. whereby said key is adapted to be nested and snugly occupy the space within said saddle at the mouth; and
   H. means to releasably secure said key in said saddle.

2. The device as set forth in claim 1 wherein said key surfaces comprise outwardly facing surfaces of converging strut members.

3. The device as set forth in claim 1 wherein said strut members are composed of bars of material having a deformable surface.

4. The device as set forth in claim 3 wherein said bar stock is a continuous length reversely bent upon itself of reinforced plastic material and said means interconnecting said first and second surfaces comprises an apex at the bended portion.

5. The device as set forth in claim 1 wherein said means connecting the proximal ends of the legs of the saddle and the means connecting the hanger key to the rail comprise welding.

6. The device as set forth in claim 1 wherein said first key surface is in a common plane with the vertical plane at the end of said rail and the end of said rail overlays the confronting vertical face of the corner support.

7. The device as set forth in claim 3 wherein the base of said saddle diverges from the upper edge of said saddle toward the lower edge of said saddle defining an edge at the juncture of the upper surface of the base of said saddle and said second surface to bite into and deform said second surface defining a seat to receive said edge and resist downward movement of said rail.

8. The device as set forth in claim 7 wherein the distal end of said saddle is below the horizontal plane of the proximal end of said saddle.

9. The device as set forth in claim 7 wherein said deformable material is of a thickness such that when said key substantially occupies the mouth of said saddle and when said rail is at about, but slightly above the plane of said frame when assembled to said support, a vertical force on said rail will cause said edge to bite into and embed itself defining a seat in said second surface when said rail is in said horizontal plane.

10. The device as set forth in claim 1 wherein said means to releasably secure said key and said saddle comprises a keeper to be received within said saddle between said first and second surfaces.

11. The device as set forth in claim 10 wherein said keeper comprises a tapered member and having a flange at the larger end and an extending body portion with said body portion being sized to be received in said saddle between said first and second surfaces.

12. The device as set forth in claim 11 wherein a hole is provided through said body and said legs and a shaft is provided to extend through said aligned holes.

13. The device as set forth in claim 12 wherein the shaft comprises a headed bolt and a nut.

14. A connector joint comprising, a support having a vertical face, a rail, and means to connect said rail and support including a retainer saddle extending from the support defining a mouth opening toward said rail and having a first size and shape, means connecting the saddle to the support, a hanger key having a tapered wedge shaped configuration with an intermediate cross-sectional area slightly larger than said size and of a companionate shape, means to secure said key to said rail, said key being adapted to be nested and snugly occupy the space within said saddle, and a coating of deformable material between said saddle and said key to provide a cushion surface between the saddle and said key to soften noises in assembly and on relative movement of said key and saddle.

15. The device as set forth in claim 14 wherein the material comprises a coating jacketing the key.

16. The device as set forth in claim 15 wherein the key comprises a reversely bent rod length.